United States Patent [19]

Bellaire

[11] Patent Number: 5,254,163
[45] Date of Patent: Oct. 19, 1993

[54] PIGMENT PREPARATIONS

[75] Inventor: Helmut Bellaire, Ludwigshafen, Fed. Rep. of Germany

[73] Assignee: BASF Aktiengesellschaft, Ludwigshafen, Fed. Rep. of Germany

[21] Appl. No.: 831,911

[22] Filed: Feb. 6, 1992

[30] Foreign Application Priority Data

Feb. 25, 1991 [DE] Fed. Rep. of Germany ....... 4105861

[51] Int. Cl.$^5$ .............................................. C09C 1/44
[52] U.S. Cl. ..................................... 106/477; 106/472
[58] Field of Search ....................... 106/472, 476, 477; 423/445, 460

[56] References Cited

U.S. PATENT DOCUMENTS 3,996,059  12/1976  Stansfield ........................ 106/308 N

OTHER PUBLICATIONS

Coating, Druckfarben-Chemie, pp. 72 & 73, "Herstellung von Farbbandern", Mar. 1972.
Coating, Druckfarben-Chemie, pp. 213 & 214, C. Lorenz, "Farbbandherstellung", Jul. 1972.

Primary Examiner—Mark L. Bell
Assistant Examiner—Chris Gallo
Attorney, Agent, or Firm—Oblon, Spivak, McClelland, Maier & Neustadt

[57] ABSTRACT

Pigment preparations useful for preparing color ribbons contain from 20 to 40% by weight, based on the weight of the preparation, of a pigment based on carbon black, from 1 to 10% by weight, based on the weight of the preparation, of a dispersant based on a reaction product of polyhydroxystearic acid with an amine, and from 50 to 79% by weight, based on the weight of the preparation, of olein.

4 Claims, No Drawings

PIGMENT PREPARATIONS

The present invention relates to novel pigment preparations containing from 20 to 40% by weight, based on the weight of the preparation, of a pigment based on carbon black, from 1 to 10% by weight, based on the weight of the preparation, of a dispersant based on a reaction product of polyhydroxystearic acid with a diamine or a hydroxyalkylamine, and from 50 to 79% by weight, based on the weight of the preparation, of olein, and to the use thereof for preparing color ribbons.

The preparation of carbon black pastes and their use in color ribbon inks are well known. For use in color ribbon inks, the carbon black must meet the following requirements:
high color strength
minimal oil absorption
small particle size
ready dispersibility
minimal water absorption
good flow characteristics in the presence of animal, vegetable or mineral oils.

Since in general these requirements cannot all be satisfied at one and the same time, it is desirable to make the best possible selection among the properties. Frequently, even oil-soluble dyes, such as C.I. Solvent Orange 3, C.I. Solvent Violet 8, C.I. Solvent Blue 4 or C.I. Solvent Black 5, are added to enhance the desired properties. Owing to the high light stability of carbon black, which confers the necessary document fastness on color ribbon inks, it will not be possible to do without carbon black; it is desired to use it in a very high concentration.

This desire runs counter to the flow characteristics of a carbon black dispersion. Owing to the small size and the surface constitution of the carbon black particles, the specific oil consumption is very high and the application media develop structural viscosity which limits the use of higher quantities of carbon black.

It is an object of the present invention to make available a novel highly concentrated carbon black preparation which shall be advantageously suitable for preparing color ribbons.

We have found that this object is achieved by the pigment preparations defined at the beginning.

Suitable pigments based on carbon black are for example commercial gas blacks, furnace blacks or flame blacks, of which the use of gas blacks is preferred.

Of particular usefulness are carbon blacks having a particle size of from 0.5 to 3 μm.

The content of pigment based on carbon black in the pigment preparations of the present invention ranges from 20 to 40 % by weight, preferably from 25 to 35 % by weight, in particular from 30 to 33 % by weight, each percentage being based on the weight of the preparation.

Suitable dispersants based on the reaction product of polyhydroxystearic acid with a diamine or hydroxyalkylamine are known per se and described for example in U.S. Pat. No. -A-3,996,059.

Polyhydroxystearic acid is a polyester which is obtainable for example by heating hydroxystearic acid, eg. commercial 12-hydroxystearic acid or else 9- or 10-hydroxystearic acid, at from 160° to 200° C. in the presence of an inert organic diluent, eg. toluene or xylene, and removing from the reaction mixture the water formed in the course of the esterification reaction.

Preference is given to using reaction products of polyhydroxystearic acids which have an acid number of from 10 to 150 mg of KOH/g, preferably from 20 to 50 mg of KOH/g.

Amines which are suitable for reaction with the abovementioned polyhydroxystearic acid conform for example to the formula

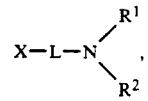

where L is $C_2$-$C_6$-alkylene, which is straight-chain or branched and may be hydroxyl-substituted, $R^1$ and $R^2$ are identical or different and each is independently of the other hydrogen or $C_1$-$C_{20}$-alkyl, and X is hydroxyl, amino or $C_1$-$C_4$-monoalkylamino.

Specific examples of amines are 3-dimethylaminopropylamine, 3-octadecylaminopropylamine and 3-diethyl-amino-2-hydroxypropanol.

The reaction of polyhydroxystearic acid with the amine can be effected by stirring the reactants with one another, preferably at from 50 to 250° C. and also preferably in an inert atmosphere.

If desired, the reaction can be carried out in inert organic liquid, eg. toluene or xylene, which is then removed at the end of the reaction, for example by distillation.

Suitable dispersants also include acid addition salts of the abovementioned reaction products and products thereof with alkylating agents, for example with dimethyl sulfate or diethyl sulfate.

The dispersant content of the pigment preparations of the present invention is from 1 to 10 % by weight, preferably from 3 to 10 % by weight, in particular from 5 to 8 % by weight, each percentage being based on the weight of the preparation.

The novel pigment preparations also have an olein content which ranges from 50 to 79 % by weight, preferably from 60 to 70 % by weight, in particular from 63 to 67 % by weight, each percentage being based on the weight of the preparation.

Olein for the purposes of the present invention is technical grade oleic acid as formed in fat splitting. It may still contain small amounts of stearic acid, palmitic acid and other fatty acids.

The pigment preparations of the present invention may additionally contain about 10–50 % by weight, based on the weight of the preparation, of non-drying, animal or vegetable oils, such as neat's foot oil, bone oil, groundnut oil, beet oil, sperm oil, castor oil, rapeseed oil or pork fat.

To prepare the novel pigment preparations, the carbon black, dispersant, olein and any non-drying, animal or vegetable oils to be included are mixed in the abovementioned weight ratio and dispersed for example in a ball mill, bead mill or three-roll mill.

The pigment preparations of the present invention are suitable in an advantageous manner for preparing color ribbons for matrix printers, typewriters or chain printers, for which purpose they are applied to a base fabric of cotton, silk or polyamide. The preparation of color ribbons is described for example in Coating 1972, 72–73, 213–214.

Although the proportion of carbon black is very high in the pigment preparations of the present invention, they do not give rise to the customary problems in the preparation of color ribbons. These problems are generally due to the fact that the carbon black preparation shows thixotropic behavior and is not conveyed by the transport rolls of the impregnating machine, allowing the ribbon to run dry.

By contrast, the novel pigment preparations remain fluent.

The following examples further illustrate the invention:

EXAMPLE 1

A mixture of 30 g of gas black (Spezialschwarz 4 from Degussa), 5 g of the dispersant described in Example 1 of U.S. Pat. No. -A-3,996,059, and 65 g of olein were bead-milled until the particle size of the carbon black was from 1 to 3 μm.

The viscosity of the resulting pigment preparation was 200 mPas. The area enclosed by its thixotropic loop measured 3654 Pa/S.

The preparation was highly suitable for preparing a color ribbon.

EXAMPLE 2

(comparison)

Example 1 was repeated, except that no dispersant was added. Viscosity and thixotropic index were impossible to determine. The preparation was unsuitable for preparing a color ribbon.

We claim:

1. A pigment preparation containing from 20 to 40% by weight, based on the weight of the preparation, of a pigment based on carbon black, from 1 to 10% by weight, based on the weight of the preparation, of a dispersant based on a reaction product of polyhydroxystearic acid with a diamine or hydroxyalkylamine, and from 50 to 79% by weight, based on the weight of the preparation, of olein.

2. A pigment preparation as claimed in claim 1, containing from 25 to 35% by weight, based on the weight of the preparation, of a pigment based on carbon black.

3. A method of using a pigment preparation as claimed in claim 1 for preparing color ribbons comprising the step of applying said pigment preparation to a base fabric.

4. A method according to claim 3 wherein said base fabric is selected from the group consisting of cotton, silk, and polyamide.

* * * * *